United States Patent
Wright et al.

(10) Patent No.: US 9,501,051 B2
(45) Date of Patent: Nov. 22, 2016

(54) CONTROL APPARATUS AND RELATED METHODS

(71) Applicant: Quirky, Inc., New York, NY (US)

(72) Inventors: Josh Wright, New York, NY (US); Ben Kaufman, New York, NY (US); Gabe Ochoa, New York, NY (US)

(73) Assignee: Flextronics International USA, Inc., San Jose, CA (US)

( * ) Notice: Subject to any disclaimer, the term of this patent is extended or adjusted under 35 U.S.C. 154(b) by 0 days.

(21) Appl. No.: 14/667,127

(22) Filed: Mar. 24, 2015

(65) Prior Publication Data

US 2015/0271900 A1    Sep. 24, 2015

Related U.S. Application Data

(60) Provisional application No. 61/969,725, filed on Mar. 24, 2014.

(51) Int. Cl.
| | |
|---|---|
| H05B 37/00 | (2006.01) |
| H05B 39/00 | (2006.01) |
| H05B 41/00 | (2006.01) |
| G05B 15/02 | (2006.01) |
| F24F 11/00 | (2006.01) |
| H05B 37/02 | (2006.01) |

(52) U.S. Cl.
CPC ............. *G05B 15/02* (2013.01); *F24F 11/006* (2013.01); *F24F 11/0012* (2013.01); *F24F 11/0015* (2013.01); *H05B 37/0272* (2013.01); *F24F 2011/0068* (2013.01); *F24F 2011/0091* (2013.01)

(58) Field of Classification Search
None
See application file for complete search history.

(56) References Cited

U.S. PATENT DOCUMENTS

| | | |
|---|---|---|
| 2012/0098439 A1 | 4/2012 | Recker et al. |
| 2012/0130557 A1* | 5/2012 | West et al. ................... 700/291 |
| 2013/0257315 A1* | 10/2013 | Restrepo et al. ............. 315/362 |
| 2014/0239843 A1* | 8/2014 | Hoang ......................... 315/291 |

FOREIGN PATENT DOCUMENTS

WO    2013011337 A1    1/2013

OTHER PUBLICATIONS

The above references were cited in an International Search Report issued on Jun. 25, 2015, which is enclosed, that issued in the corresponding International Application No. PCT/US2015/022247.

* cited by examiner

*Primary Examiner* — Anh Tran
(74) *Attorney, Agent, or Firm* — Sheridan Ross P.C.

(57) ABSTRACT

An exemplary aspect comprises a control apparatus comprising: (a) a controller comprising a microprocessor; (b) a wireless transceiver in communication with said microprocessor and operable to communicate over a wireless network with an application on a mobile device; (c) a light switch controlled by the controller; (d) a sensor in communication with the controller; and (e) a front panel that allows a user to interface with the controller.

21 Claims, 12 Drawing Sheets

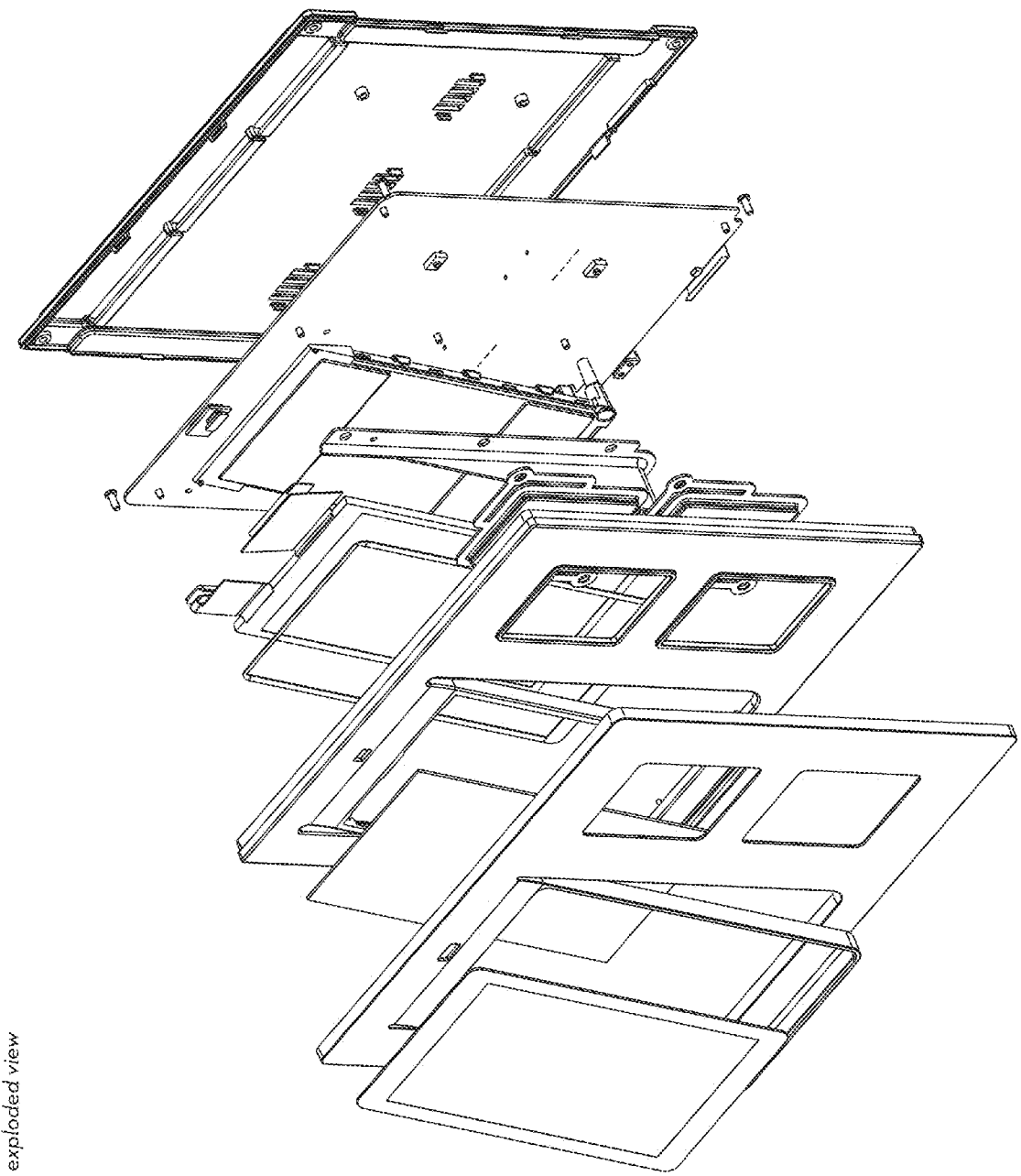

CONTROL APPARATUS AND RELATED METHODS

CROSS-REFERENCE TO RELATED APPLICATIONS

This application claims priority to U.S. Provisional Pat. App. No. 61/969,725, filed Mar. 24, 2014, entitled "Control Apparatus and Related Methods." The entire contents of that application, including the appendices, are incorporated herein by reference.

INTRODUCTION

One or more exemplary embodiments described herein comprise a Controller, with a multi-touch LCD display, that runs software allowing a user to control all products in a local "ecosystem."

In an exemplary embodiment, BLE (Bluetooth Low Energy) allows the Controller to know which resident is in front of the device, and therefore present the preferences preset by that resident.

One or more exemplary embodiments relate to devices, systems, and methods for controlling features of a home or building ecosystem, including temperature, lighting, smoke and fire detection, water usage, water leaks energy consumption, locking and unlocking doors and entrances, security, entertainment and sound systems, computing equipment, and appliances.

One or more exemplary embodiments described herein comprise one or more of a control panel, a multi-radio hub, one or more sensors, and a light switch. Beyond the multi-touch display, one or more mechanical switches may be programmed to perform a series of actions. The one or more mechanical switches may provide the user with the flexibility to set preset actions or series of actions that are triggered by the ecosystem (either the light load, or any other connected action). This provides the user with a quick way to trigger actions without having to manipulate a touchscreen.

An exemplary aspect comprises a control apparatus comprising: (a) a controller comprising a microprocessor; (b) a wireless transceiver in communication with the microprocessor and operable to communicate over a wireless network with an application on a mobile device; (c) a light switch controlled by the controller; (d) a sensor in communication with the controller; and (e) a front panel that allows a user to interface with the controller.

In one or more embodiments: (1) the controller is programmed by a user to perform one or more actions triggered by operation of the light switch; (2) the controller is operable to communicate, via the transceiver, with a second control apparatus located in the same building as the control apparatus of the controller; (3) the apparatus further comprises a microphone and a speaker; (4) the second control apparatus also comprises a microphone and a speaker, and the controller is operable to allow a user to communicate with the second control apparatus as an intercom; (5) the control apparatus comprises a relay/converter box configured to be inserted into a standard gang box; (6) the front panel is configured to be connected to the relay/converter box in a plurality of configurations; (7) the front panel is configured to be connected to the relay/converter box via a first number of holes configured to accept a second number of posts on the relay/converter box, and wherein the first number exceeds the second number; (8) the front panel is configured to be connected to the relay/converter box in one of a plurality of alignments; (9) the standard gang box is a single gang box; (10) the standard gang box is a double gang box; (11) the sensor is a Bluetooth Low Energy sensor; (12) the sensor is a motion sensor; and (13) the motion sensor is an infrared sensor.

Another exemplary aspect comprises a method for operation of an apparatus comprising (a) a controller comprising a microprocessor; (b) a wireless transceiver in communication with the microprocessor and operable to communicate over a wireless network with an application on a mobile device; (c) a light switch controlled by the controller; (d) a sensor in communication with the controller; and (e) a front panel that allows a user to interface with the controller, the method comprising: (i) receiving via a wireless network one or more commands from a mobile device storing the application, the application having received commands from a user to perform one or more actions to be triggered by operation of the light switch; and (ii) in response to the light switch being operated, performing the one or more actions.

The above and other features of exemplary aspects and embodiments will be apparent from the drawings and detailed description provided herein.

BRIEF DESCRIPTION OF THE DRAWINGS

FIGS. 16-17 depict exploded views.

DETAILED DESCRIPTION OF CERTAIN EXEMPLARY EMBODIMENTS

In an exemplary embodiment, a control apparatus may be installed to replace existing single or double gang box light switches.

Figure 1:
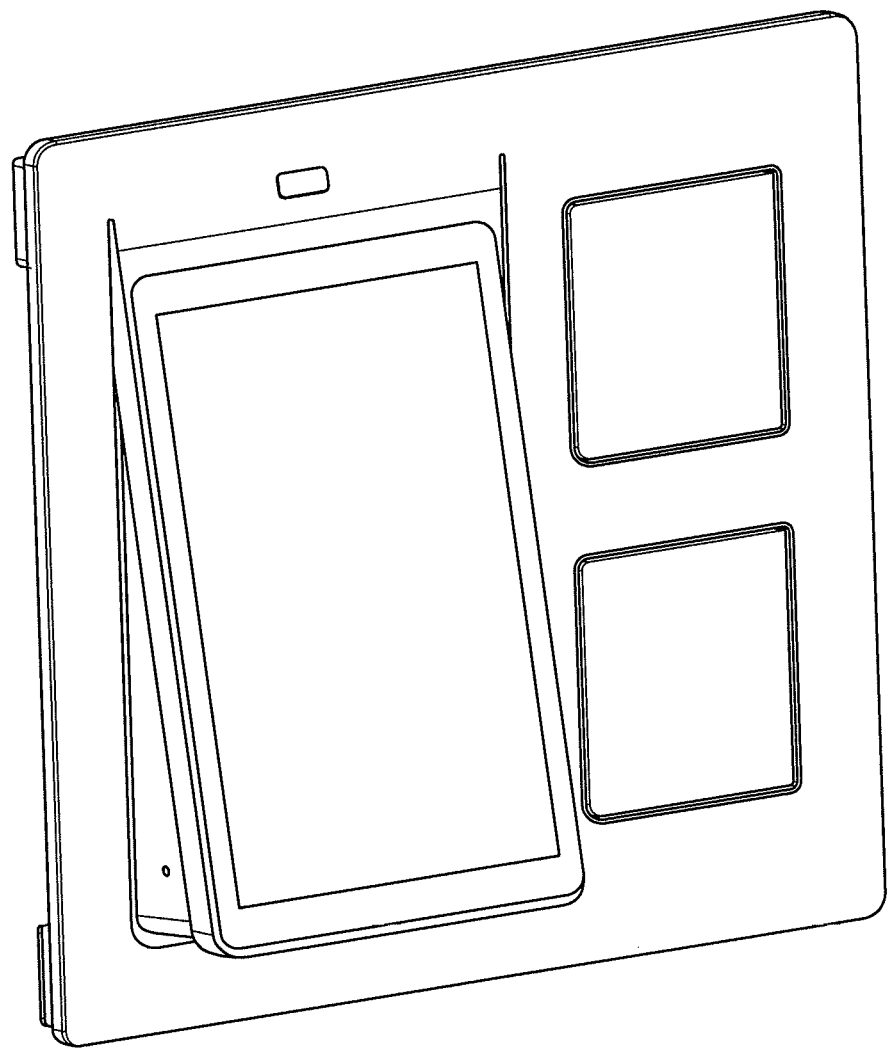
FIG. 1 depicts an exemplary control apparatus of an embodiment.
Figure 5:
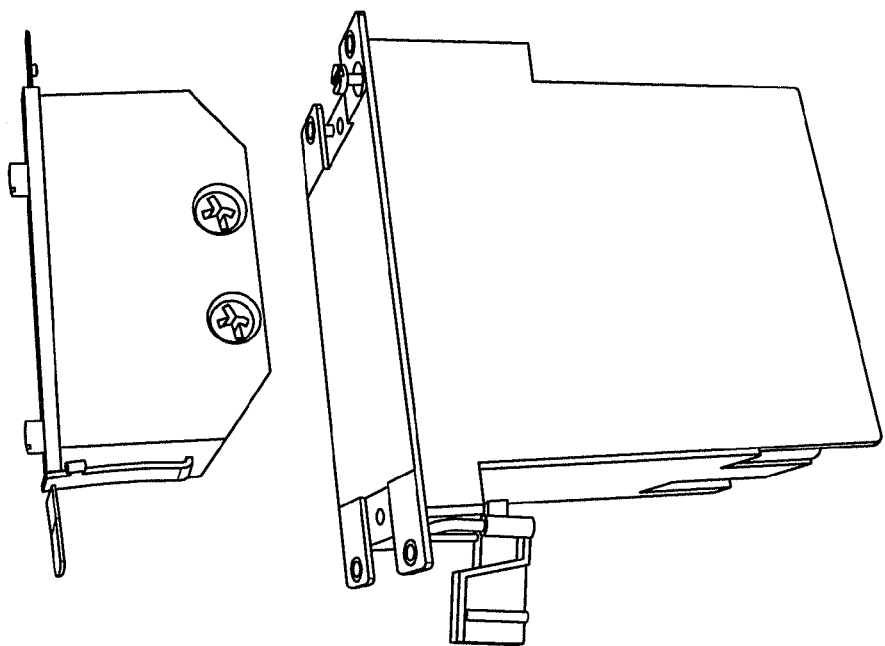
FIG. 5 depicts how a relay and AC/DC converter box of an embodiment may be inserted into a gang box.
Figure 4:
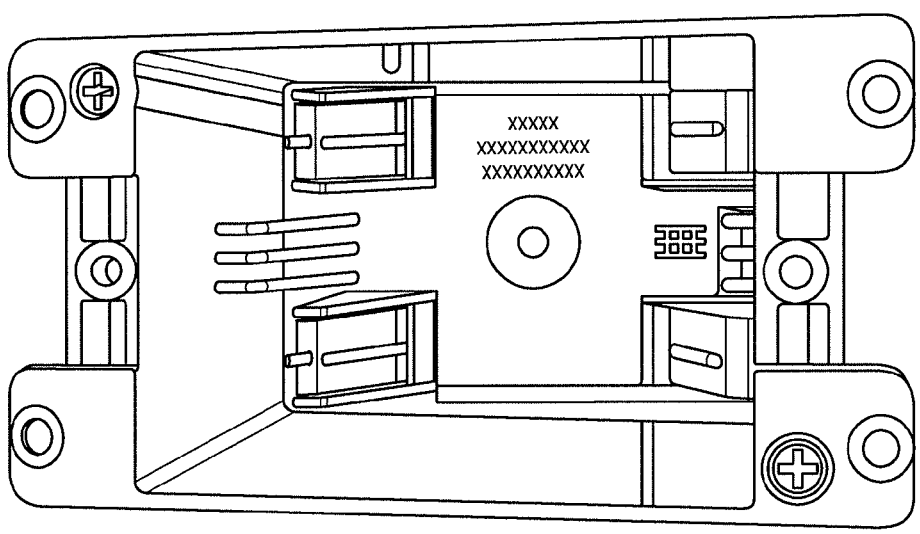
FIG. 4 depicts a typical gang box.
Figure 6:
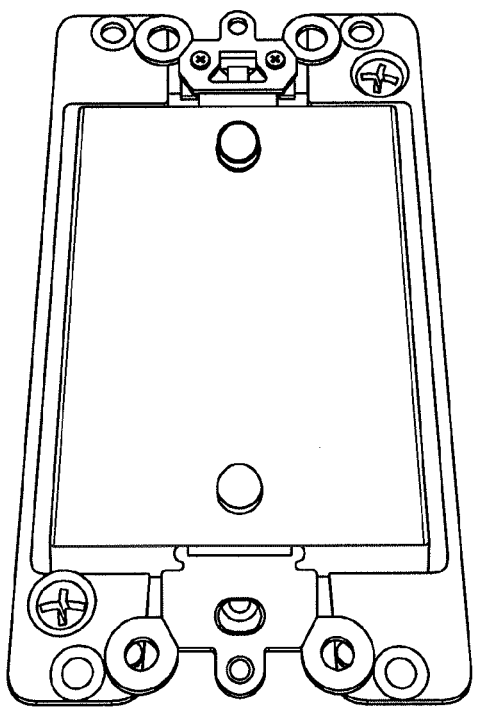
FIG. 6 shows the relay/converter box fully inserted.
Figure 7:
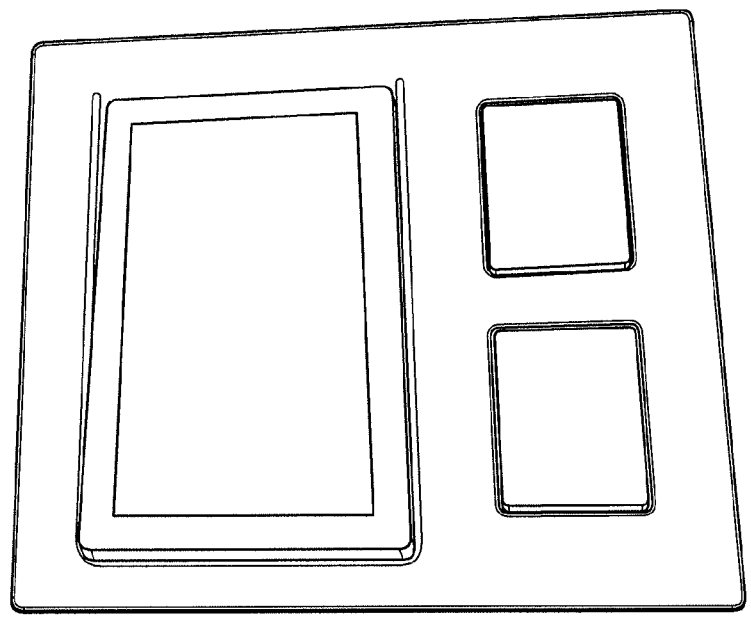
FIG. 7 depicts a front face plate of an embodiment.
Figure 8:
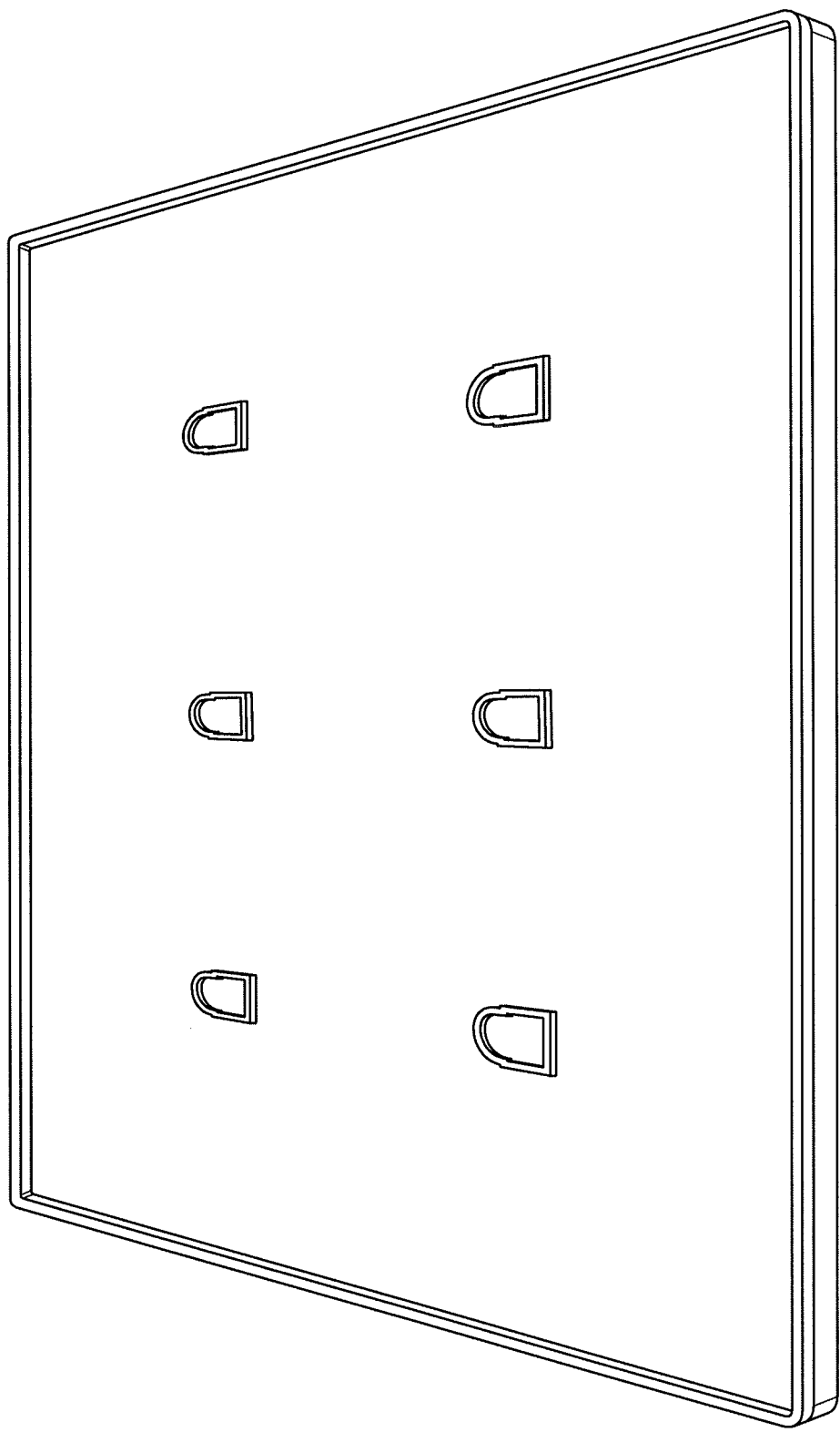
FIG. 8 depicts a back view of an exemplary face plate (the holes accept posts of a relay/converter box).

The apparatus may comprise two parts (1) a "power box" (see FIG. 1) which fits within the existing gang box and may contain two solid state relays, as well as an AC/DC converter (see FIGS. 4-6); and (2) a "Controller," which may comprise a touch screen (see FIG. 2), switches, and a hub. The Controller may be fastened to the power box via a keyed mechanism.

In an exemplary embodiment, the Controller contains electronics, antennas, switches, a speaker, a microphone, and perhaps additional sensors. Exemplary construction details are provided below and depicted in FIG. 3.

Figure 9:
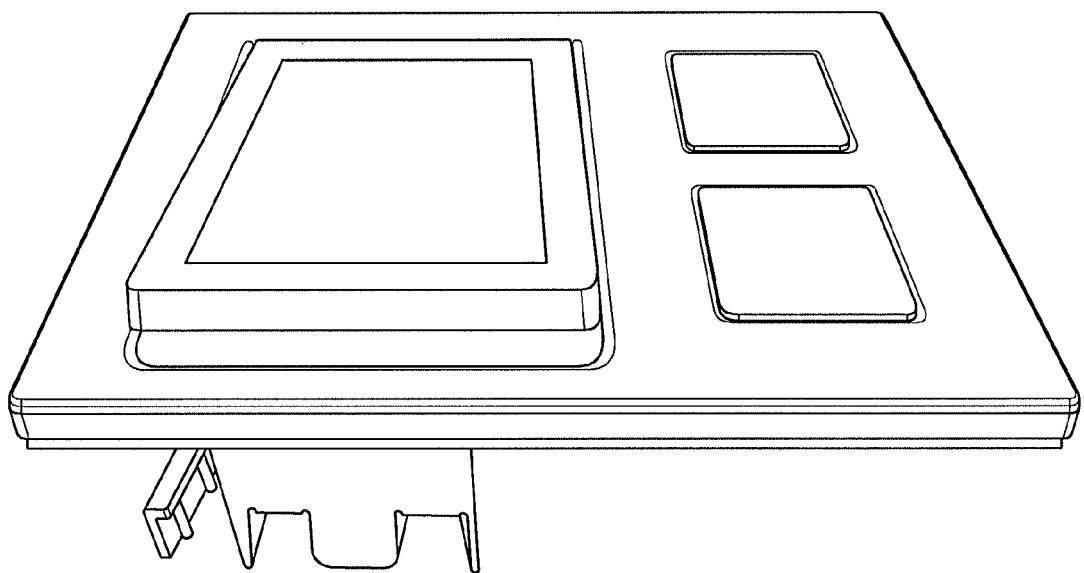
FIG. 9 depicts an exemplary face plate attached to a relay/converter box, aligned to the right.
Figure 10:
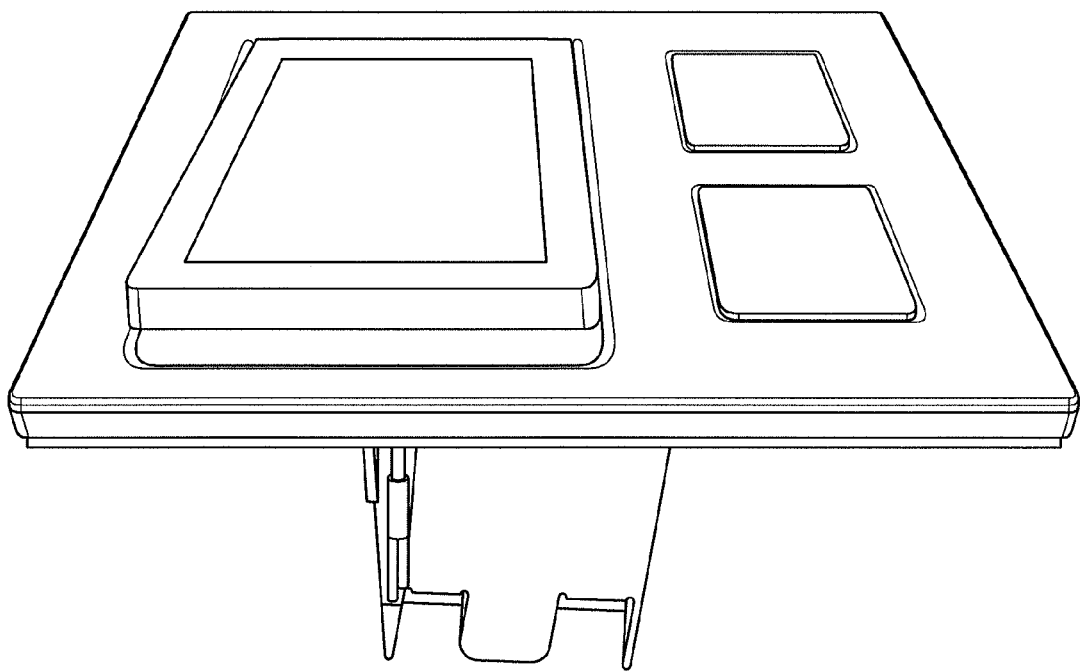
FIG. 10 depicts a center alignment.

To account for certain installations where a gang box is installed close to a doorframe or corner of a room, the Controller may be offset from the gang box (either right or left aligned) to allow it to always give the appearance of being centered. See FIGS. 9-10.

An exemplary embodiment is currently sold as the "Wink Relay", by Wink Inc., and is described at http://www.wink.com/products/wink-relay-touchscreen-controller/.

Figure 11:
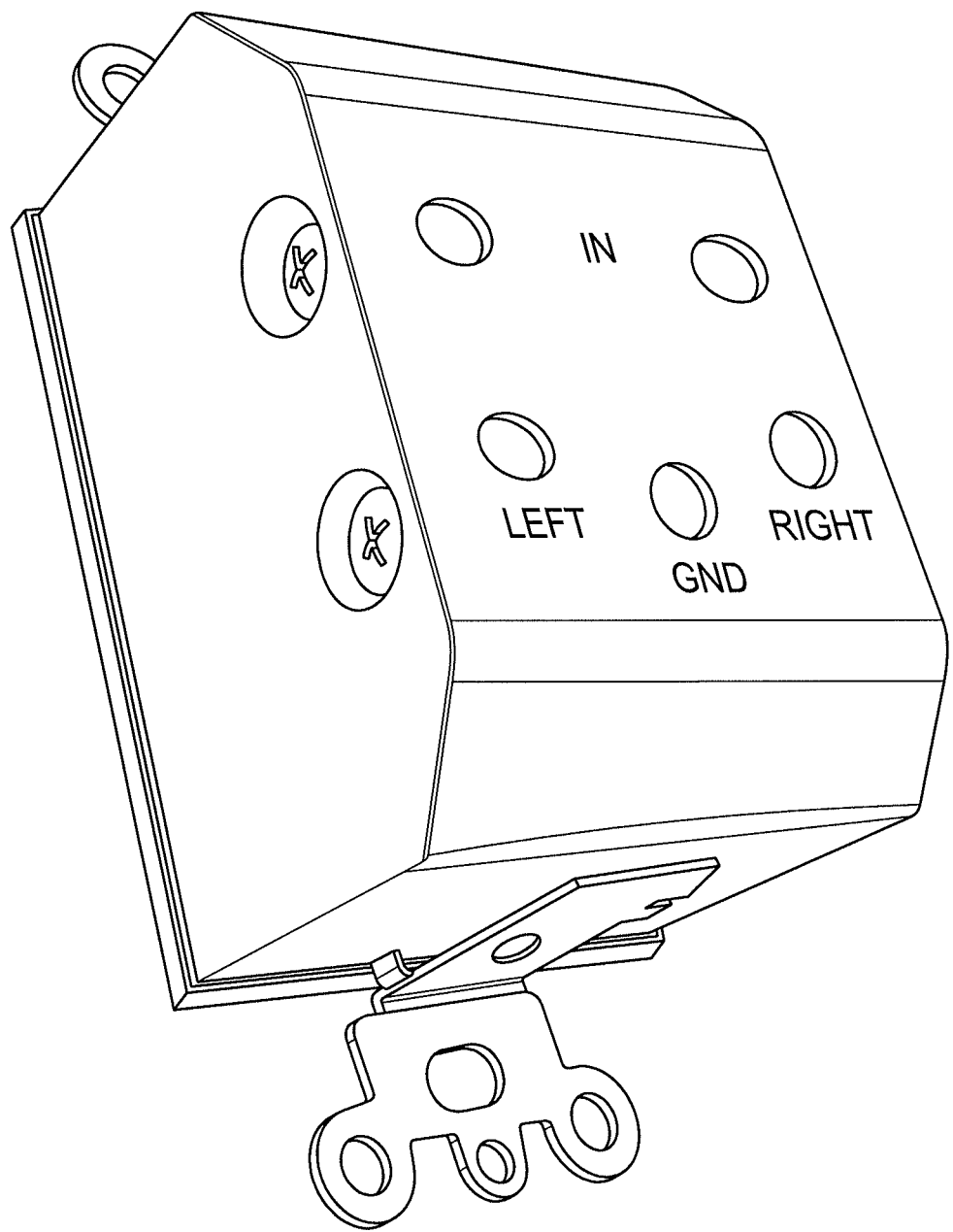
FIG. 11 depicts exemplary back cable mounting.
Figure 12:
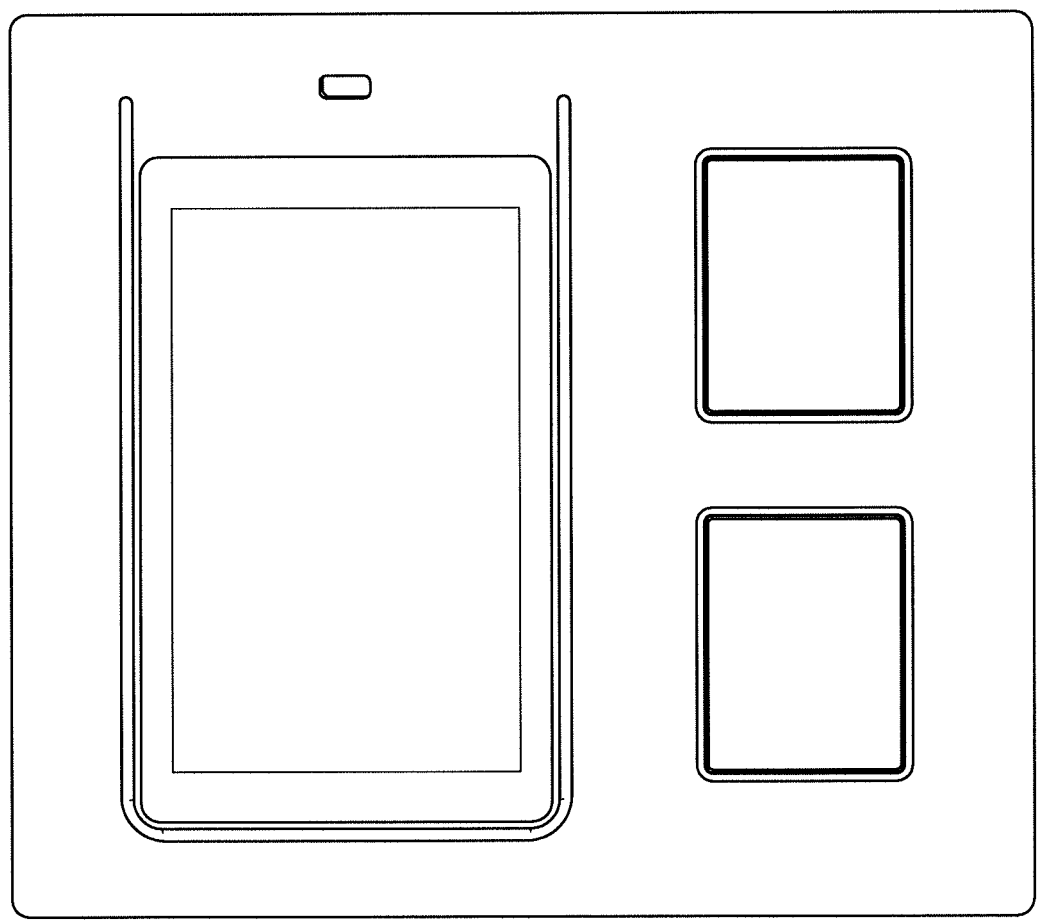
FIGS. 12-15 depict exemplary views of a switch device of an embodiment.
Figure 13:
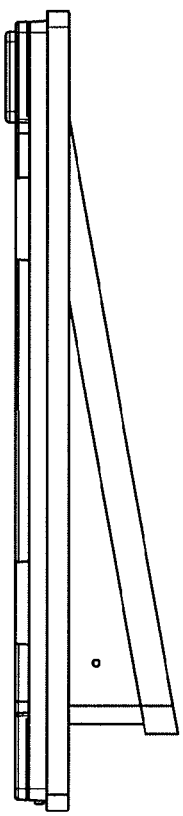
Figure 14:
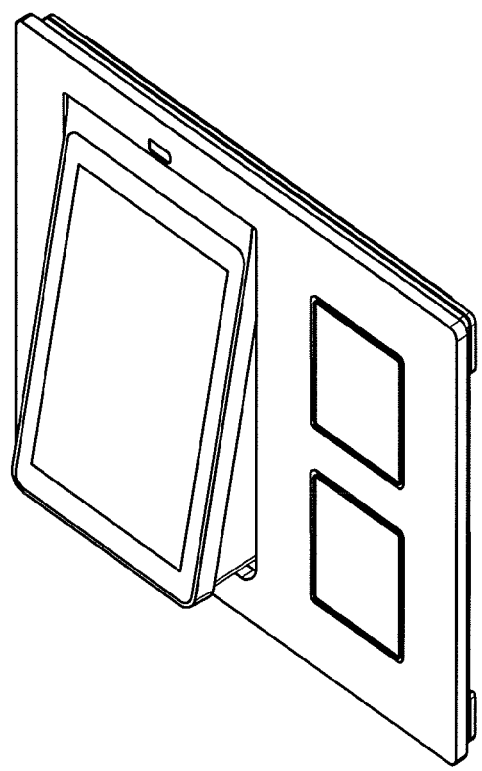
Figure 15:
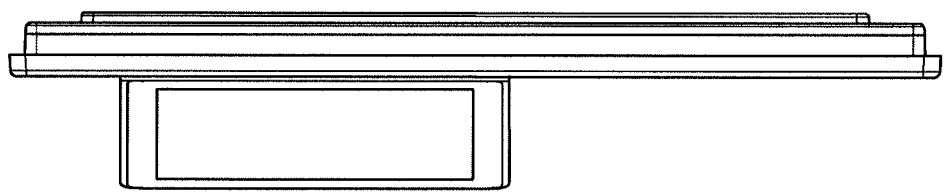

Exemplary Installation
1. Turn off the circuit.
2. Unscrew light switch/dimmer.
3. Remove wires.
4. Insert wires into "power box" according to their purpose. For example, wiring may be assigned as follows:
   a. In contains the black wire.
   b. Left usually contains the red wire corresponding to the left switch.
   c. In a two gang box, "Right" contains the red wire corresponding to the right switch (if applicable; if not, leave empty).
   d. Ground should contain the green wire.
5. Screw power box into gang box.
6. Turn circuit back on.
7. Assure Green light turns on in power box.
8. Attach Controller to power box, preferably assuring that the Controller appears centered. Choose from one of 3 attachment points. See FIG. 11.

When a User Walks Up to the Control Apparatus
An Infrared (IR) sensor may detect a user approaching from a few feet away, and the display may be turned on. Those skilled in the art will appreciate that any suitable motion or position sensor may be used instead of an IR sensor.

Paired with a user's phone via Bluetooth, a Controller knows who a user is and loads a user's own customized experience and devices.

A user may instantly begin interacting with Controller via the touch screen or physical buttons.

When a User Wants to Control a User's Lights from Home
Configure a Controller's name to reflect its location (e.g., "Family Room").

Configure a user's local lights by assigning them a name and icon that represents each existing load (e.g., Pendant light, Ceiling Fan, Recessed Lights, Track lighting).

Further configuration such as smart bulbs may allow more in-depth controls.

Each load is laid out on the workspace, or a user can select another room to control.

User is presented with an On/Off switch, and depending on the type of load, an additional modal view of settings may be accessed to adjust any number of options including dimming/color etc. See FIG. 2.

When a User Wants to Control a User's Lights Away from Home
An exemplary embodiment is provided with Wi-Fi connectivity to a user's portable device (e.g., smart phone) and to other devices in the vicinity. One example of an appropriate Wi-Fi-based system for providing such connectivity is Wink.

Being connected to a Wink ecosystem means that everything a user can control from the Controller, a user can control from any phone running the Wink app. A Wink ecosystem may comprise a technology platform that enables use of a Wink enabled smartphone application to communicate, via a wireless internet connection, with one or more associated Wink enabled devices. Those skilled in the art will appreciate that similar systems may be used with embodiments described herein without departing from the scope of the invention.

Using a smartphone app, a user can select Controller from a Device list.
Choose which room a user would like to control.
Control the light loads as if a user were physically standing in front of the Controller.

Figure 2:
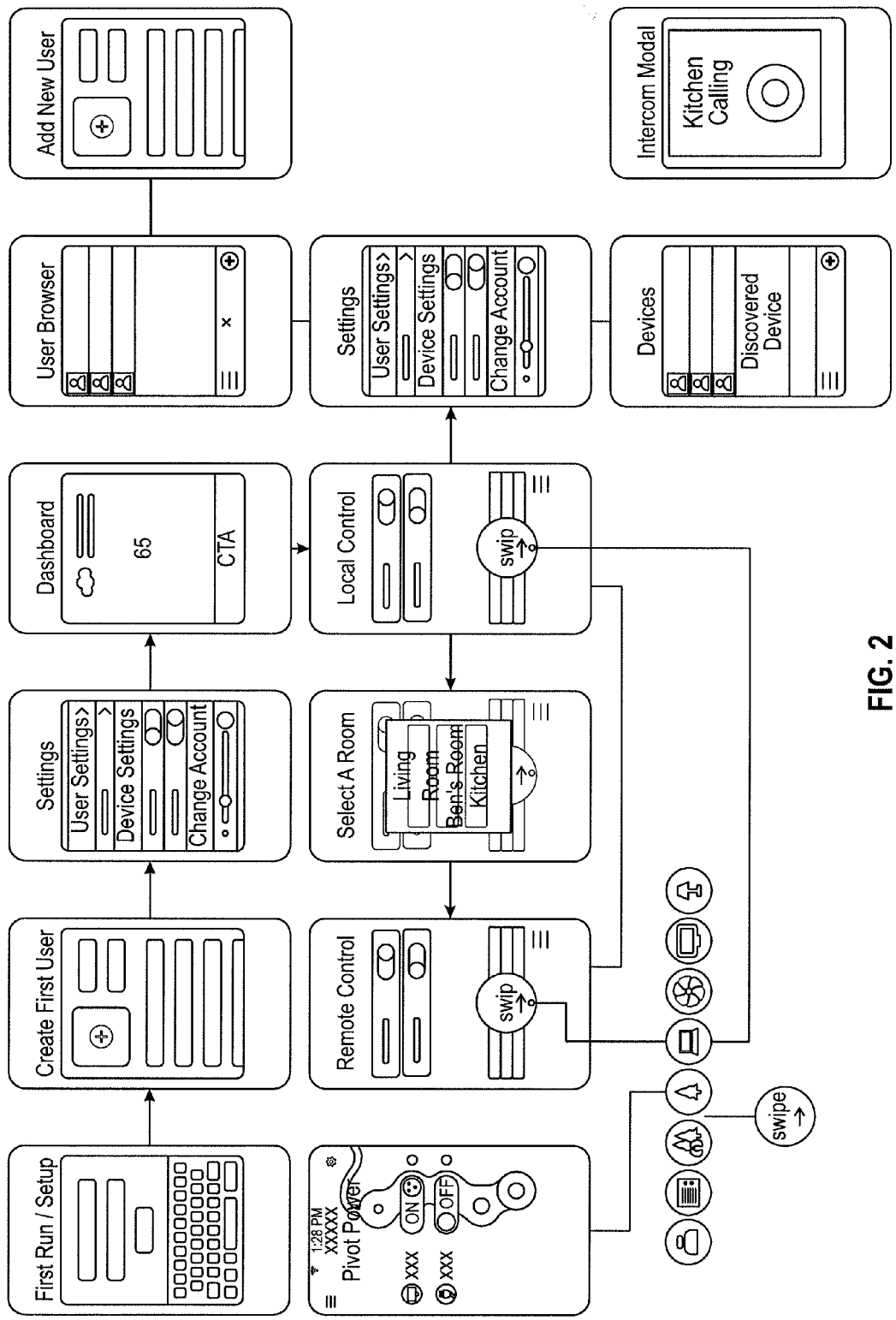
FIG. 2 depicts exemplary app screens of an embodiment.

FIG. 2 depicts exemplary app screens.
The "First Run/Setup" display (see FIG. 2) allows a user to create a new account.
Dashboard Display
The dashboard (see FIG. 2) may be laid out to display pertinent information set by the user, with certain defaults as well as customized "widgets".
Exemplary Dashboard Elements:
   Time
   Date
   Weather
   Inside Temp
   Load Controls CTA
Customized Dashboard Elements:
   Deeper Weather Insight
   Open Alerts (Garage, etc.)
   Social Media
Settings Screen (see FIG. 2)
User Settings
User Browser
The user browser allows a user to add, remove and edit users.
Adding a user:
1. Enter the user browser from the settings screen.
2. Click the + sign to add a new user.
3. Controller displays BLE (Bluetooth Low Energy) devices within range.
4. Select the proper device by clicking on it.
5. Controller prompts a user to create a username for a user profile.
6. Type in desired username and click OK.
7. Controller lands a user on User Preference Screen to begin setting user preferences.

Adding a user will display a modal view which searches for BLE compatible devices in the area.
Once the desired device is located, and selected, a user name is requested.
User Preferences
User Preferences allows a user to set up a Controller the way a user likes it, with the user's own Wink account, the user's own devices and the user's own Dashboard layouts.
User Preferences may contain three sections (Dashboard, Devices, and Change Wink Account).
Setting Dashboard Preferences
1. Choose which "widgets" a user would like to use, in addition to the defaults, by checking the box next to each item the user would like displayed.
   a. Any widget with further customization should include a settings icon that displays a modal for setting up that additional configuration (adding a user's twitter account, for example).
2. Choose Celsius/Fahrenheit for temperature displays.
Device Settings
Room Settings
   Room Name
Light Load Settings
Load Name (Front High Hats, Track Lighting)
Load type (Standard Light/Fan/Smart Bulbs)
Device List
A list of devices may be assigned to a user's account and made available for the user to control.
Any device controllable with On/Off triggers can be grouped together to be controlled together with a single action.
Each device and group can be assigned to a physical button and displayed or hidden in an "Alternate Device Callout" with a check box.

Change Account

This button allows a user to disassociate a user profile with a wink account and sign into another.

Local Control Screen

When operating locally, the 1 or 2 connected loads may be the main focus of the screen. There may be an interface for switching these two off and on with extreme ease (single tap on/off).

Below this main interaction point may be listed additional devices that have been assigned by the user. They may only load items in the list that are pertinent to the present room, but the experience may be freeform (see "Alternate Device Callout" below).

Remote Control Screen (access a different room)

1. Bring up a Room Switching Modal with a tap of the room icon.
2. Select the room to work with.
3. This screen may be a duplicate of the Local Control Screen for that room.
4. This may reset after x number of seconds so that someone doesn't enter the room and control the wrong room. The user may not have to hit a "back button."

Alternate Device Callout

Additional devices may be selected by the user to appear in the bottom of the control screen. A scrollable marquee may be located toward the bottom of the screen. A user may slide these until locating the device a user would like to control and selecting it with a tap. When the device is selected it loads the interaction screen for that device. (WAC, Pivot Power, Etc. . . . )

The last icon in this list may be a "+" to add more devices. This may load a user's existing Wink account device list and provide the ability to add more devices via discovered Zigbee (IEEE 802.15.4) devices as well as Wifi devices, depending on how each is configured.

Room Switching Modal

Simple modal view showing all of the connected Controllers and listing them by name. These connections may be established registered devices as well as unregistered devices seen on BLE and displayed as "New Controller" or "Unregistered Controller" and listed in a sub category below as "Newly Discovered".

For use of the intercom, each room in this view may have a speaker icon next to it so the room can be accessed for intercom, as well as an "ALL" speaker.

Intercom

The intercom works from within the Room Switching Modal, and is indicated via an incoming intercom modal on the receiving end.

When a User Wants to Use Mechanical Switches

Program each switch to control either a local load or any switchable product in the local environment (e.g., a Wink Ecosystem). Alternatively, a user can group local and connected products together.

Press the switch to control a user selected product or group of products.

When a User Wants to Use the Intercom:

Select the Room Selection Icon from any control screen.

Click the speaker icon next to the room a user want to open communication with or click "ALL".

While holding a finger on this button, speak naturally and the room selected will receive an Intercom pop up that displays which room is calling and have its own speaker icon to be able to talk back.

When a User is Setting Up

Once the Controller is installed, it can be set up directly on the Device using a setup wizard or via Bluetooth from any device running the corresponding app.

Local Setup:

Setup asks a user for a Login or prompts a user to create an account.

Setup asks for user WiFi Info (select a user network, enter a user network password).

Controller connects to the cloud, registers with, e.g., Wink services and downloads data regarding all of a user existing Wink products.

Setup asks a user to name a user's local loads.

Setup asks a user to assign actions to the 2 physical switches.

Setup asks a user to register users via their phones w/ Bluetooth.

Application Running on Portable Device (Example)

Launch the app on any compatible device.

Login or Register for an account.

Tap "Add new Device".

Select Controller from the list.

App searches via BLE for a new Controller.

Once found, app submits a user's Wifi info.

Controller connects to the cloud, registers, e.g., with the Wink services and downloads data regarding all of a user's existing Wink products.

Setup asks a user to name a user's locally connected loads.

Setup asks a user to assign actions to the 2 physical switches.

Setup pre-configures a first user and prompts a user to create more users via their phones w/ Bluetooth.

The dashboard offers an "At a Glance" glimpse at the world around a user.

Time

Temperature

Weather

Important system info (e.g., "Garage door opened").

Controlling Other Connected Products

Scroll through the list of available products at the bottom of the load control screen.

Tap on the product a user would like to control.

Interact with the product via its own custom page view.

Controlling Different Rooms

Select Change Rooms Icon from any control screen.

Select which room a user would like to switch to and tap it.

Begin controlling this room as if it was local.

Discovering New Products

Whenever a new Controller is installed it will automatically show up under Device settings/Devices From Load Control Screen select "Settings"

Select Device Settings/Devices

All registered Controller devices are listed on top and can be configured by clicking on them.

All unregistered Controller devices are listed below under "Discovered Devices"

Click any of these devices to register it.

Give the new Controller a name.

Permissions allow a user to specify who can access what and when.

Figure 3:
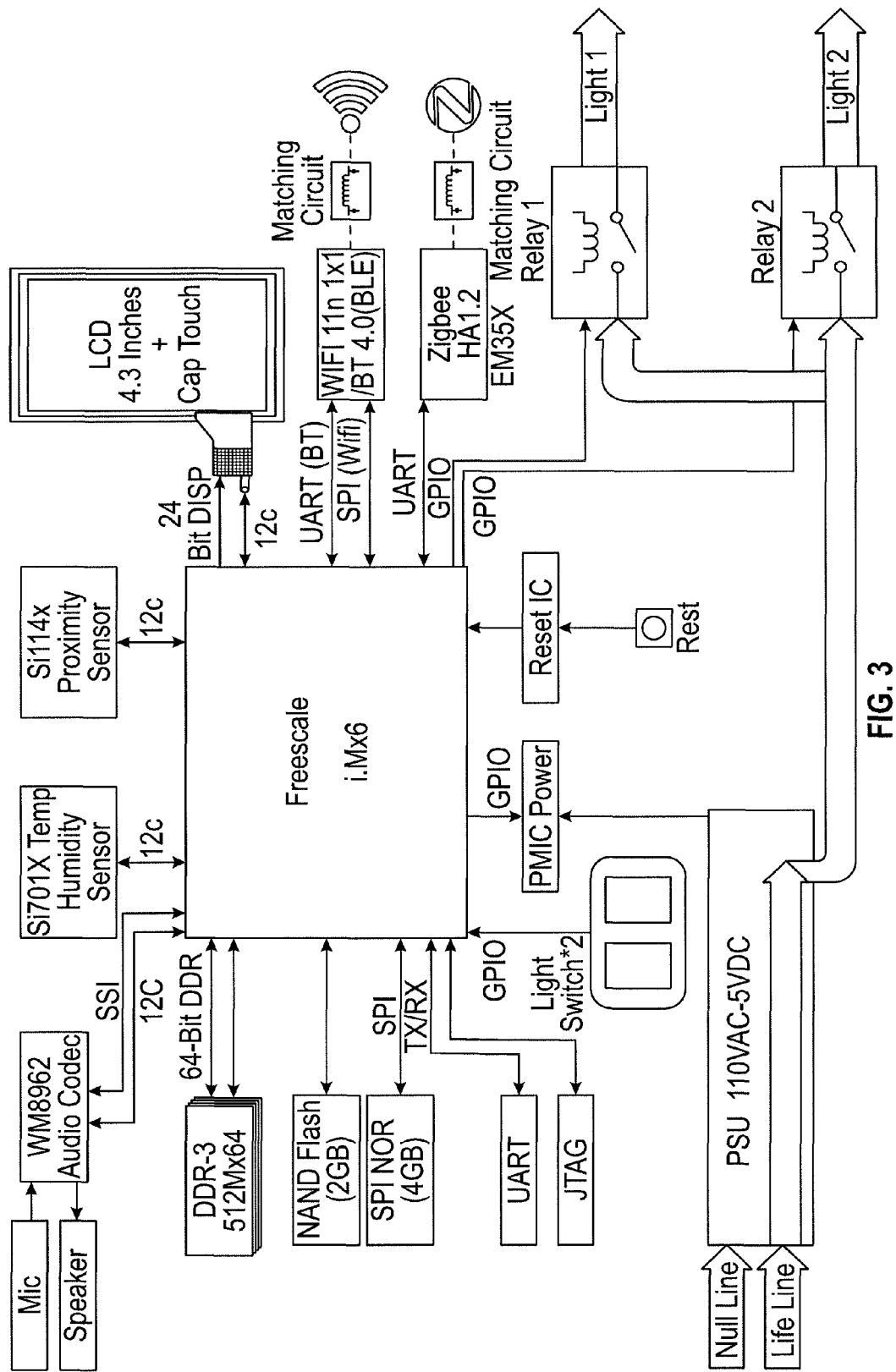
FIG. 3 depicts exemplary construction details of a control apparatus of an embodiment.

Exemplary Construction and Components (See FIG. 3)

TABLE 1

| Description | Manufacturer | Manufacturer Part Number |
| --- | --- | --- |
| Central Processor - Host | Freescale | i.MX6 |
| WiFi 802.11 a/b/g/n and Bluetooth Module | Semco/Samsung | BCM4334 Based Semco SWB-B53 Module |
| Zigbee | Silicon Labs | EM357 SoC |
| DDR3 - Host | Micron | MT41K256M16HA-125:E |

TABLE 1-continued

| Description | Manufacturer | Manufacturer Part Number |
| --- | --- | --- |
| NAND FLASH - Host Serial NOR FLASH | Micron | MT29F16G08MAAWP |
| DC-DC PMIC | Freescale | MMPF0100F0ZES |
| Proximity Sensor | | |
| Temperature & Humidity Sensors | | |
| Audio Codec | Wolfson | WM8962 |
| Microphone | | |
| Speaker | | |
| LEDs | | |
| AC-DC Power Supply Unit | | |
| TFT-LCD Display | | |
| Capacitive Touch Panel | | |
| Wireless Antennas | | |
| PCB | | |

Central Processor—Host (Freescale i.MX6)
  This board allows the system to run Android as the underlying OS and launch a custom build of the wink app. This app may be catered to this application but allow for the addition of all products compatible with the wink ecosystem.
System Memory—Host
DDR3 512M×64
NAND Flash 2 GB
Serial NOR FLash 4 MB
4.3" Capacitive Multi-Touch Screen [MRD-DISP-001]
  The central interaction point of the product, the touch screen is where most of the interaction happens. With a personalized dashboard as a user default, a quick touch switches to the switch screen, allowing control of the local loads the switch replaced, as well as any other components.
Bluetooth/WIFI Combo Chip (Semco SWB-B53 based on Broadcom BCM4334) [MRD-SW-002]
  Not only providing the connectivity of the unit, this chip allows for Bluetooth and BLE connectivity which opens up an entire new spectrum of products the Wink platform can take advantage of.
    Bluetooth, while as stated, allows control of other products, it may also allow other Bluetooth devices to control the light switch.
    BLE allows the system to serve custom experiences based on who is standing at the panel, as their phone will be recognized.
    The WIFI capability provides for connectivity to the Internet via a local router.
Zigbee Module (Silicon Images EM357 Ember)
[MRD-SW-003]
  The use of Zigbee enables support for existing products such as wireless light bulbs (Philips Hue, etc.) as well as development of future products. The use of Zigbee also acts as a passive extender for other Zigbee products the user may already own, thus increasing the range in which their existing products work with each other.
2× Momentary Switches
  These switches can control the local loads on them (the lights a user switches were tied to) and also can be configured to control virtually any smart product that reacts to on/off etc. (Garage Door, Smart light bulbs located anywhere [and not just one], Pivot Power Genius). The satisfying click lets a user know the button was pressed and is a quick way to interact with a user's home without having to interact with the screen if a user is on the go.
Motion/Prox Sensor
[MRD-INP-001]
  The IR Sensor is how the switch knows a user is coming up to interact. This gives the switch time to wake up and provide a user with the info or control a user needs immediately without a user having to waste time waking the unit up. Those skilled in the art will appreciate that any suitable motion or position sensor may be used instead of an IR sensor.
2× Solid State AC Relays
  The A/C Relays are switches. The switch is wired to replace 1 or 2 switches with the same SKU. The Relay, when given the signal, switches the local loads on and off. This signal can come from the local buttons, the touch screen, or any other device running the wink app.
AC/DC Converter
  The converter may be how the apparatus is powered. The AC power from the gang box is converted to DC.
Temperature & Humidity Sensor
  With the inclusion of temp and humidity sensors, a user has more data about their home at their fingertips.
Microphone
[MRD-INP-003]
  The microphone gives control opportunity as well as the ability to incorporate an internal intercom system. Voice commands may be used, and other sounds may be recognized (doors opening/closing, dogs barking, etc.).
Speaker
[MRD-OUT-001]
  As with the microphone, the speaker may allow for intercom operability as well as give the device a personality and voice, as well as reminders and audible alerts.

Further technical details of one or more exemplary embodiments are provided below.
Exemplary Structure
An exemplary embodiment may comprise:
  Main Board with Central Processor, Memories, PMIC, WiFi/Bluetooth SIP Module, Zigbee, Temp & Humidity Sensors, Microphone, Speaker, Connectors, Buttons
  TFT-LCD Display Module with Capacitive Touch and Protection Lens
  AC-Relay Unit
  AC-DC Power Supply Unit with Connectors
  Mechanical Assembly Parts
  Hardware Reset Button
  Internal Antennas for WiFi/BT and Zigbee
  Cable/connectors for signal Interfaces and Power connections
  The device may support two mechanical buttons for controlling either local or remote loads; S/W configurable via GPIO
  The device may attempt to fit into a North American single gang and double gang wall receptacle
Exemplary Installation Method
  The device may provide three positions for the power box to be placed—to right, center, or to left.
A. Exemplary Hardware Functional Block Diagram
  The block diagram depicted in FIG. 3 shows exemplary high level architecture of the controller and power box.

Exemplary Central Processor—Host

The device may use a Freescale i.MX6 family processor supporting Android OS framework. [PR-001] (PR citations refer to TABLE 2 below).

Exemplary System Memory—Host

The device may support the following system memory [PR-002]:

DDR3 512M×64
NAND FLASH 2 GB
Serial NOR FLASH 4 MB

Exemplary WiFi/Bluetooth [MRD-COM-001] [MRD-COM-002]

Semco SWB-B53 module based on Broadcom BCM4334 may be used to support IEEE 802.11 g/n and Bluetooth 4.0 LE. [PR-003]

The testing and qualification of the device may be based on 802.11 g and n. [PR-004]

The device may use the 2.4 GHz frequency band for 802.11 n. [PR-005]

The device may support both 20 MHz and 40 MHz bandwidth at IEEE 802.11n. [PR-006]

The lightswitch may support Bluetooth 4.0 LE. [PR-007]

The WiFi Bluetooth coexistence may be handled by the SWB-B53 module. [PR-008]

The device may have one antenna that is shared between WiFi and Bluetooth. [PR-009]

Exemplary Zigbee Functionality [MRD-COM-003] [MRD-SW-003]

The Zigbee functionality may be supported using Silicon Images EM357 Ember® ZigBee chip. [PR-010]

The device may support the coexistence of Zigbee with WiFi and BT since both the technologies use 2.4 GHz ISM band. [PR-011]

The device may support Zigbee mesh networking capability. [PR-012]

Exemplary TFT-LCD Module with Touch [MRD-DISP-001]

The device may use a 4.3 inch or other TFT-LCD display panel. [PR-013]

Exemplary Motion/Proximity Sensor [MRD-INP-001]

The device may have a built-in motion or proximity detection sensor to allow a user to wake up the display by, for example, waving hands 10 cm in front of display screen. [PR-014a]

The device may allow a detectable range of 4 to 5 ft with minimal latency. [PR-014b]

Exemplary Temperature and Humidity Sensors

The device may have sensor(s) to enable the Smart Light Switch to collect room temperature and humidity information. [PR-015]

Exemplary Microphone and Speaker [MRD-INP-003] [MRD-OUT-001]

The analog microphone and speaker may be interfaced with the Audio codec to the i.MX6 processor to provide intercom and voice notification feature. [PR-016]

Exemplary AC-Relay Switch

The AC relay switch may fit in the power box [PR-017]

Exemplary AC-DC Power Supply Unit

The AC-DC PSU may operate at AC input between 100 VAC to 240 VAC 50/60 Hz [PR-018]

The AC-DC PSU may fit in the power box [PR-019]

Exemplary Mechanical Design

External Specifications
User I/O Interfaces
Touch Screen
Push Buttons×2
LED Indicator×2
Hardware Reset Button×2
Speaker×1
Microphone×1
Motion Sensor×1
Temperature & Humidity Sensor(s)
Single/Double Gangbox Real Estate The device may fit inside, cover, and mechanically affix to both North American single-gang and double-gang wall receptacles. [PR-020]

Exemplary Single Gangbox may have dimensions:
Width: 50 mm
Height: 87 mm
Depth: 60 mm Exemplary Double Gangbox may have dimensions:
Width: 94 mm
Height: 95 mm
Depth: 70 mm The power box and device may follow the NEMA code. Further exemplary design aspects are depicted in FIGS. 12-17.

Figure 16:
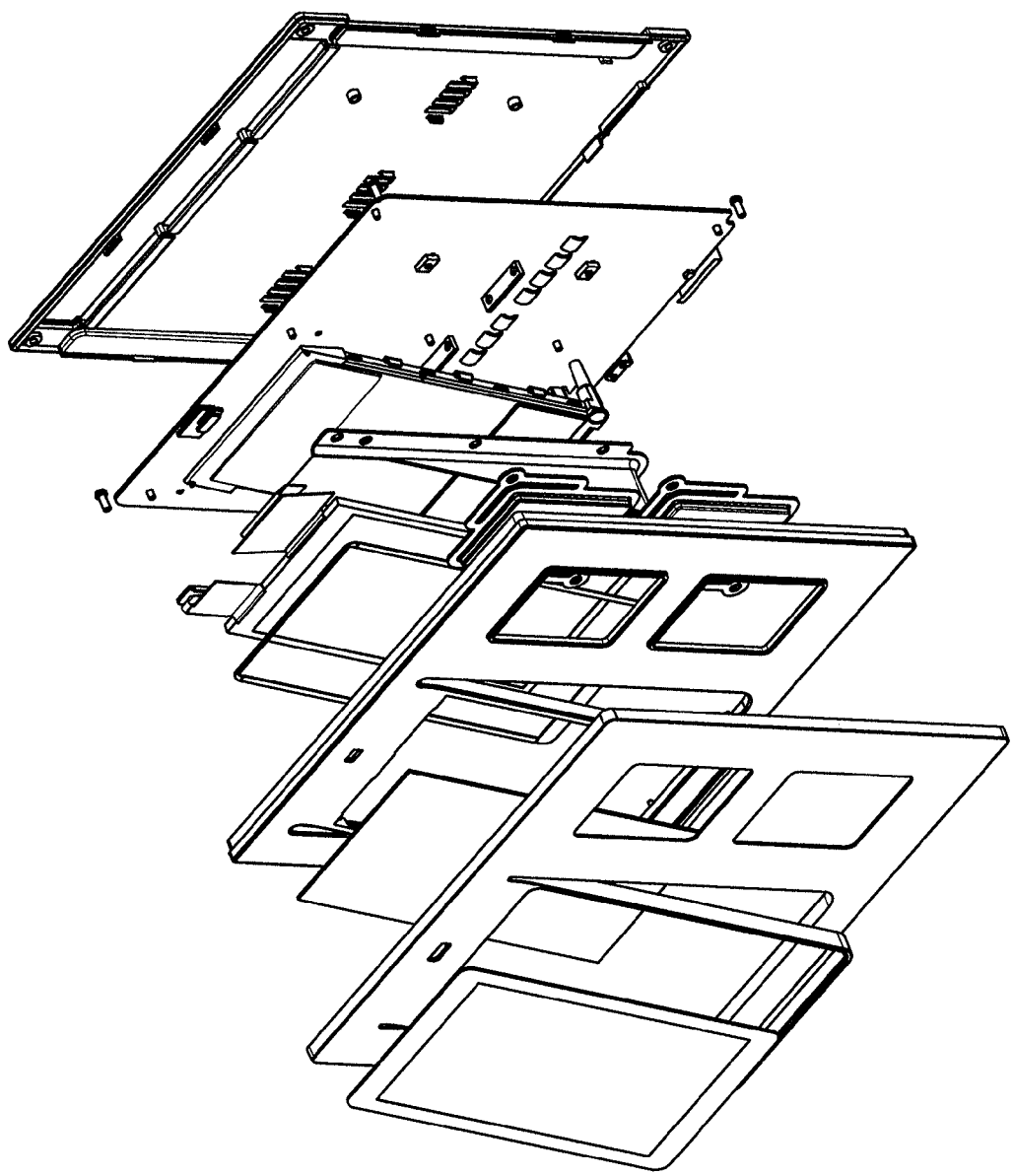

FIGS. 12-15 depict exemplary views of a switch device of an embodiment. FIGS. 16-17 depict exploded views.

Mechanical Buttons

The single gang box design may have two mechanical switches supporting following requirements [PR-021]:

The device itself may have the two buttons to the right and programmable to control either the local load or other functions within the home.

The device may have terminals for 2 loads; in a single-gang configuration, one may be empty.

The single gangbox design with two switches is the nominal case. The nominal design may provide expandability support for the 3- and 4-gang plates.

The mechanical button may have a feel similar to Omron's B3F-4005 tactile switch.

The operating force may be 260 g.

The size of the switch may be 12.5 mm×12.5 mm.

The dome of the switch may be 8.4 mm in diameter.

TABLE 2

Summary of Exemplary Technical Specifications

| PRD Number | Specification | Compliance |
|---|---|---|
| PR-001 | The device may use Freescale i.MX6 family processor supporting Android OS framework. | |
| PR-002 | The device may support system memory defined in Section 3.3.2 | |
| PR-003 | Semco SWB-B53 module based on Broadcom BCM4334 may be used to support IEEE 802.11 g/n and Bluetooth 4.0 LE. | |

TABLE 2-continued

Summary of Exemplary Technical Specifications

| PRD Number | Specification | Compliance |
|---|---|---|
| PR-004 | The testing and qualification of the device may be based 802.11 g and n. | |
| PR-005 | The device may use the 2.4 GHz frequency band for 802.11 n. | |
| PR-006 | The device may support both 20 MHz and 40 MHz bandwidth at IEEE 802.11n. | |
| PR-007 | The lightswitch may only support Bluetooth 4.0 LE. | |
| PR-008 | The WiFi Bluetooth coexistence may be handled by the SWB-B53 module. | |
| PR-009 | The device may have only one antenna that is shared between WiFi and Bluetooth. | |
| PR-010 | The Zigbee functionality may be supported using Silicon Images EM357 Ember ® ZigBee chip. | |
| PR-011 | The device may support the coexistence of Zigbee with WiFi and BT since both the technologies use 2.4 GHz ISM band. | |
| PR-012 | The device may support Zigbee mesh networking capability. | |
| PR-013 | The device may use a 4.3" TFT-LCD display panel. | |
| PR-014a | The device may have a built-in motion or proximity detection sensor to allow end user to wake up the display by waiving hands 10 cm in front of display screen. | |
| PR-014b | The device may allow a detectable range of 4 to 5 ft with minimal latency. | |
| PR-015 | The device may have sensor(s) to enable the Smart Light Switch to collect room temperature and humidity information. | |
| PR-016 | The analog microphone and speaker may be interfaced with the Audio codec to the i.MX6 processor to provide intercom and voice notification feature. | |
| PR-017 | The AC relay switch may fit in the power box | |
| PR-018 | The AC-DC PSU may operate at AC input between 100 VAC to 240 VAC 50/60 Hz | |
| PR-019 | The AC-DC PSU may fit in the power box | |
| PR-020 | The device may fit inside, cover, and mechanically affix to both North American single-gang and double-gang wall receptacles. | |
| PR-021 | The single gang box design may have two mechanical switches supporting requirements in Section 3.4.6 | |
| PR-022 | The 802.11 g/n may support minimum data rate of 0.25 Mbps | |
| PR-023 | The device may comply with the environmental requirements as described in Section 5.1 | |
| PR-024 | The device may comply with the reliability requirements as described in Section 5.2. | |
| PR-025 | The device may comply with the regulatory compliance requirements to place the product in the US market. | |
| PR-026 | The device may comply with the regulatory compliance requirements to place the product in the Canadian market. | |
| PR-027 | The device may be ZigBee Certified. | |

Those skilled in the art will understand that the listed components and materials, and the specific configuration depicted, are intended to be exemplary only, and that other configurations, components, and materials may be used without departing from the scope of the disclosure. More generally, while certain exemplary aspects and embodiments have been described herein, many alternatives, modifications, and variations will be apparent to those skilled in the art. Accordingly, exemplary aspects and embodiments set forth herein are intended to be illustrative, not limiting. Various modifications may be made without departing from the spirit and scope of the disclosure.

The invention claimed is:

1. A control apparatus comprising:
a controller comprising a microprocessor;
a wireless transceiver in communication with said microprocessor and that communicates over a wireless network with an application on a mobile device;
a virtual light switch controlled by said controller;
a manual light switch controlled by a user;
a sensor in communication with said controller to detect a user being proximal to the control apparatus; and
a touch display panel that allows a user to interface with said controller to control the virtual light switch, wherein, in a first mode, a light is controlled by the user via touch input received by the virtual light switch and, in a second mode, the light is controlled by the user via physical displacement of the manual light switch.

2. A control apparatus as in claim 1, wherein said controller is programmed by a user to perform one or more actions triggered by operation of said light switch and further comprising a microphone that receives audible speech from the user, wherein the controller, via the wireless transceiver, transmits the speech to a selected speaker located in a room to broadcast the speech throughout the room.

3. A control apparatus as in claim 1, wherein said controller is operable to communicate, via said transceiver, with a second control apparatus located in the same building as the control apparatus of said controller.

4. A control apparatus as in claim 3, further comprising a microphone and a speaker and a sensor to collect room temperature and humidity information for display to a user.

5. A control apparatus as in claim 4, wherein said second control apparatus also comprises a microphone and a speaker, and said controller is operable to allow a user to communicate audible speech with said second control apparatus as an intercom.

6. A control apparatus as in claim 1, wherein said control apparatus comprises a relay/converter box configured to be inserted into a standard gang box and wherein the controller, via the wireless transceiver, transmits a user command received at the control apparatus to a user selected control apparatus in another room to control, by the virtual light switch of the selected control apparatus, a light in the other room.

7. A control apparatus as in claim 6, wherein said touch display panel is configured to be connected to said relay/converter box in a plurality of configurations or alignments.

8. A control apparatus as in claim 1, wherein, in the first mode, the light controlled by the user is in a common room with the controller, wherein, in a third mode, the light is controlled by the user via a portable communication device in signal communication, via the wireless transceiver, with the controller, and, in a fourth mode, a light in a different room is controlled by the controller, the controller, via the wireless transceiver, transmitting a user command received at the control apparatus to a user selected control apparatus in the different room to control, by the virtual light switch of the selected control apparatus, the light in the different room.

9. A control apparatus as in claim 1, wherein, in the first mode, the light controlled by the user is in a common room with the controller, wherein, in a third mode, the light is controlled by the user via a portable communication device in signal communication, via the wireless transceiver, with the controller, and, in a fourth mode, a light in a different room is controlled by the controller, the controller, via the wireless transceiver, transmitting a user command received at the control apparatus to a user selected control apparatus in the different room to control, by the virtual light switch of the selected control apparatus, the light in the different room and further comprising a microphone that receives audible speech from the user, wherein the controller, via the wireless transceiver, transmits the speech to a speaker of the selected control apparatus to broadcast the speech throughout the different room.

10. A control apparatus as in claim 6, wherein said standard gang box is a single gang box and wherein the controller determines an identity of a user and automatically loads a user's customized user interface, with different users having different customized user interfaces.

11. A control apparatus as in claim 6, wherein said standard gang box is a double gang box and wherein the controller determines an identity of a user and automatically loads information about the user's communication devices to enable the controller to interact with the user's communication devices.

12. A control apparatus as in claim 1, wherein said sensor is a Bluetooth Low Energy sensor and wherein the controller executes a room switching modal that identifies by name plural connected control apparatuses in the building and connection status, the connection status being one of new controller, unregistered controller, and newly discovered controller.

13. A control apparatus as in claim 1, wherein said sensor is a motion sensor.

14. A control apparatus as in claim 13, wherein said motion sensor is an infrared sensor.

15. A method for operation of an apparatus comprising (a) a controller comprising a microprocessor; (b) a wireless transceiver in communication with said microprocessor and operable to communicate over a wireless network with an application on a mobile device; (c) a virtual light switch controlled by said controller; (d) a sensor in communication with said controller to detect a user being proximal to the controller; (e) a manual light switch controlled by a user; and (f) a touch display panel that allows a user to interface with said controller to control the virtual light switch, the method comprising:

receiving via a wireless network one or more commands from a mobile device storing said application, said application having received commands from a user to perform one or more actions to be triggered by operation of said light switch; and in response to said light switch being operated, performing said one or more actions, wherein, in a first mode, a light is controlled by the user via touch input received by the virtual light switch, the light being in a common room with the controller, wherein, in a second mode, the light is controlled by the user via the mobile device in signal communication, via the wireless transceiver, with the controller, and, in a third mode, a light in a different room is controlled by the controller, the controller, via the wireless transceiver, transmitting a user command received at the control apparatus to a user selected control apparatus in the different room to control, by the virtual light switch of the selected control apparatus, the light in the different room.

16. The method of claim 15, wherein, in a fourth mode, a light is controlled by the user via touch input received by the virtual light switch and further comprising a sensor to collect room temperature and humidity information for display to a user.

17. The method of claim 15, wherein the apparatus further comprises a sensor to collect room temperature and humidity information for display to a user.

18. The method of claim 15, wherein said second control apparatus also comprises a microphone and a speaker, and said controller is operable to allow a user to communicate audible speech with said second control apparatus as an intercom.

19. The method of claim 15, wherein the controller, via the wireless transceiver, transmits a user command received at the control apparatus to a user selected control apparatus in another room to control, by the virtual light switch of the selected control apparatus, a light in the other room, wherein the controller determines an identity of a user and automatically loads a user's customized user interface, with different users having different customized user interfaces, and wherein the controller executes a room switching modal that identifies by name plural connected control apparatuses in the building and connection status, the connection status being one of new controller, unregistered controller, and newly discovered controller.

20. A control apparatus comprising:
a controller comprising a microprocessor;
a wireless transceiver in communication with said microprocessor and that communicates over a wireless network with an application on a mobile device;
a virtual light switch controlled by said controller;
a sensor in communication with said controller to detect a user being proximal to the control apparatus; and
a touch display panel that allows a user to interface with said controller to control the virtual light switch, wherein, in a first mode, a light is controlled by the user via touch input received by the virtual light switch, the light being in a common room with the controller; in a second mode, the light is controlled by the user via the mobile device in signal communication, via the wireless transceiver, with the controller; and, in a third mode, a light in a different room is controlled by the controller, the controller, via the wireless transceiver, transmitting a user command received at the control apparatus to a user selected control apparatus in the different room to control, by the virtual light switch of the selected control apparatus, the light in the different room.

21. The control apparatus of claim 20, further comprising a manual light switch controlled by a user, wherein, in a fourth mode, the light is controlled by the user via physical displacement of the manual light switch, wherein the controller executes a room switching modal that identifies, for selection by the user, by name plural connected control apparatuses in the building and connection status, the connection status being one of new controller, unregistered controller, and newly discovered controller, and further comprising a sensor to collect room temperature and humidity information for display to a user and a microphone that receives audible speech from the user, wherein the controller, via the wireless transceiver, transmits the speech to a selected speaker located in a room to broadcast the speech throughout the room.

* * * * *